US012626118B2

(12) United States Patent
Guo et al.

(10) Patent No.: US 12,626,118 B2
(45) Date of Patent: May 12, 2026

(54) TWO-DIMENSIONAL PHOTONIC CONVOLUTIONAL ACCELERATION SYSTEM AND DEVICE FOR CONVOLUTIONAL NEURAL NETWORK

(71) Applicant: ZHEJIANG LAB, Hangzhou (CN)

(72) Inventors: Qingshui Guo, Hangzhou (CN); Kun Yin, Hangzhou (CN); Chen Ji, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 681 days.

(21) Appl. No.: 18/117,412

(22) Filed: Mar. 4, 2023

(65) Prior Publication Data

US 2024/0078421 A1      Mar. 7, 2024

(30) Foreign Application Priority Data

Sep. 2, 2022    (CN) .......................... 202211070507.5

(51) Int. Cl.
*G06N 3/067* (2006.01)
*G06N 3/0464* (2023.01)

(52) U.S. Cl.
CPC ......... *G06N 3/0675* (2013.01); *G06N 3/0464* (2023.01)

(58) Field of Classification Search
None
See application file for complete search history.

(56) References Cited

U.S. PATENT DOCUMENTS

2003/0055610 A1* 3/2003 Webber .............. G06F 18/2134
702/194

FOREIGN PATENT DOCUMENTS

CN        111884727 A  * 11/2020  ........... H04B 10/516

OTHER PUBLICATIONS

"Silicon Photonic-electronic neural network for fibre Non-linearity compensation", Huang et al., 2021 (Year: 2021).*

(Continued)

*Primary Examiner* — Haimei Jiang
(74) *Attorney, Agent, or Firm* — Jiwen Chen; Joywin IP Law PLLC

(57) ABSTRACT

The present invention discloses a two-dimensional photonic convolutional acceleration system and device for convolutional neural network, comprising: a multi-wavelength light source, a signal source to be convolved, a modulator, a dispersion module, a 1×M power divider, an optical fiber delay array, a microring weighting array chip, a convolutional kernel matrix control unit, a trans-impedance amplifier array, and an acquisition and processing unit. The present invention realizes two-dimensional convolutional acceleration based on wavelength-time interleaving technology, a single modulator can realize the optical domain loading of the signal, and the convolutional operation speed is only limited to the speed of the modulator. The present invention can realize two-dimensional convolutional kernel convolutional acceleration of two-dimensional data in a single signal cycle based on two-level delay and microring weighting array chip, and solve the problem of data redundancy in traditional methods, the scheme is simple and efficient. The present invention realizes the control of convolutional kernel matrix coefficient based on the microring weighting array chip, can realize the fast update of convolutional kernel matrix coefficient, and is suitable for real-time data processing applications, the balanced photodetector can realize arbitrary convolutional kernel coefficient weighting.

9 Claims, 7 Drawing Sheets

(56)          References Cited

OTHER PUBLICATIONS

Ashtiani F, Geers A J, Aflatouni F. An on-chip photonic deep neural network for image classification[J]. Nature, 2022: 1-6.
Huang C, Fujisawa S, de Lima T F, et al. A silicon photonic—electronic neural network for fibre nonlinearity compensation. Nature Electronics, 2021, 4(11): 837-844.
Xu X, Tan M, Corcoran B, et al. "11 TOOS photonic convolutional accelerator for optical neural networks," Nature, vol. 589, No. 7840, pp. 45-51, 2021.

* cited by examiner

TWO-DIMENSIONAL PHOTONIC CONVOLUTIONAL ACCELERATION SYSTEM AND DEVICE FOR CONVOLUTIONAL NEURAL NETWORK

This application claims priority of Chinese Application No. 202211070507.5, filed Sep. 2, 2022, which is hereby incorporated by reference.

TECHNICAL FIELD

The present invention relates to the field of photonic computing technology, in particular to a two-dimensional photonic convolutional acceleration system and device for convolutional neural network.

DESCRIPTION OF RELATED ART

Artificial intelligence is now widely used in machine vision, natural language processing, automatic driving and other fields. As one of the important models of artificial intelligence technology, artificial neural network is widely used because of its excellent generalization ability and stability, in the actual data processing process, convolutional operation is the pre-operation of artificial neural network, and occupies most of the computational power of artificial intelligence operation. Because the current electronic chip uses the classical computer structure that separates the program space and data space, the data workflow between the storage unit and the computing unit is unstable and the power consumption is high, which limits the efficiency of network model training. The common solution is to improve the operational efficiency by improving the integration of electronic chips or by in-memory computing, however, due to the micro-quantum characteristics and macro-high-frequency response characteristics of electronic chips, these technologies also face great challenges. Photonic technology, which uses photonic as information carriers, has the characteristics of large bandwidth, low loss and parallelizability. At present, researchers have been attracted to apply photonic technology to artificial intelligence (see [Ashtiani F, Geers A J, Aflatouni F. An on-chip photonic deep neural network for image classification[J]. Nature, 2022: 1-6.]). The combination of photonic technology and traditional neural network is expected to give full play to the advantages of the two technologies, break through the technical development bottleneck of traditional electronic neural network with high power consumption, long delay and limited speed, and solve the limitations of technical problems of traditional electronic technology (see [Huang C, Fujisawa S, de Lima T F, et al. A silicon photonic—electronic neural network for fibre nonlinearity compensation. Nature Electronics, 2021, 4(11): 837-844.]). Firstly, the photonic neural network adopts the analog computing architecture, and the storage and calculation are carried out at the same time, which can improve the computing speed and reduce the computing delay. Secondly, based on the essential characteristics of optical transmission media, optical links have low loss characteristics, which can indirectly reduce system power consumption. Finally, comparing with electronic devices, the effective working bandwidth of photonic devices has increased by several orders of magnitude, which is more suitable for the high speed real-time operation of neural networks. For example, the scheme (see [Xu X, Tan M, Corcoran B, et al. "11 TOOS photonic convolutional accelerator for optical neural networks," Nature, vol. 589, no. 7840, pp. 45-51, 2021.]), provides the convolutional operation of the signal to be convolved and the fully connect feedforward neural network based on dispersion technology, the computing speed is close to the latest chip based on electronic technology, but the power consumption of this scheme has been greatly reduced, which provides a reliable basis for the application of photonic neural network.

Therefore, we propose a two-dimensional photonic convolutional acceleration system and device for convolutional neural network to solve the above technical problems.

SUMMARY OF THE INVENTION

The purpose of the present invention is to provide a two-dimensional photonic convolutional acceleration system and device for convolutional neural network, which realizes two-level delay based on a dispersion module and an optical fiber delay array, and realizes the signal strength weighting of different wavelengths by combining with a microring weighting array chip, so, realizes the two-dimensional convolutional kernel matrix coefficient weighting in a single signal cycle, and solves the problems of data redundancy and large volume in traditional methods, moreover, the convolutional kernel matrix can be flexibly expanded, and is applicable to the problem of multi-dimensional data convolutional operation.

The technical scheme adopted by the present invention is as follows:

A two-dimensional photonic convolutional acceleration system for convolutional neural network, comprising:

a multi-wavelength light source, generating multi-wavelength optical signals containing N wavelengths and transmitting the multi-wavelength optical signals to a modulator;

a signal source to be convolved, converting an original two-dimensional data to be convolved into a one-dimensional signal to be convolved, and transmitting the signal to be convolved to the modulator;

the modulator, loading the signal to be convolved onto the multi-wavelength optical signal, obtaining a multi-wavelength modulated optical signal, and transmitting the multi-wavelength modulated optical signal to a dispersion module;

the dispersion module, realizing equal-interval dispersion delay for the N sub-modulated optical signals corresponding to N wavelengths in the multi-wavelength modulated optical signal, obtaining the multi-wavelength modulated optical signal after dispersion delay, and transmitting the multi-wavelength modulated optical signal after dispersion delay to a 1×M power divider;

the 1×M power divider, dividing the multi-wavelength modulated optical signal after dispersion delay into M-channel multi-wavelength modulated optical signal, and transmitting the M-channel multi-wavelength modulated optical signal to an optical fiber delay array;

the optical fiber delay array, which is composed of M-segment optical fibers, increasing the equal-interval second-level delay of M-channel multi-wavelength modulated optical signal in turn to obtain a M-channel multi-wavelength modulated optical signal with second-level delay, and transmitting the M-channel multi-wavelength modulated optical signal with second-level delay to a microring weighting array chip;

the microring weighting array chip, comprising M microring weighting units, which are respectively used to weight and sum the N sub-modulated optical signals contained in each of the M-channel multi-wavelength modulated optical signal with second-level delay, and obtaining M first-level weighted summation electrical signals, and transmit M first-level weighted summation electrical signals to a trans-impedance amplifier array;

a convolutional kernel matrix control unit, providing a convolutional kernel coefficient control signal to the microring weighting array chip;

the trans-impedance amplifier array, comprising M trans-impedance amplifiers, amplifying the M first-level weighted summation electrical signals respectively, and carrying out second-level summation of the amplified M first-level weighted summation electrical signals to obtain a second-level weighted summation electrical signals, and transmit the second-level weighted summation electrical signals to an acquisition and processing unit;

the acquisition and processing unit, collecting the second-level weighted summation electrical signals, and reconstructing it into a characteristic signal corresponding to the signal to be convolved.

Further, the dispersion module is a dispersion fiber, a Bragg dispersion grating or a spatial dispersion module, a time of the equal-interval dispersion delay is: $\Delta t = 1/S_M$, wherein, $\Delta t$ is a duration of a single symbol of the signal to be convolved, and $S_M$ is a symbol rate of the signal to be convolved.

Further, increasing the equal-interval second-level delay in turn for the M-channel multi-wavelength modulated optical signal specifically as follows: a length of the optical fiber increases in turn $\Delta L = (O-1)c\Delta t/n_f$, wherein, $\Delta t$ is a duration of a single symbol of the signal to be convolved, O is a number of original two-dimensional data columns to be convolved, c is a speed of light in vacuum, and $n_f$ is a refractive index of the optical fiber.

Further, the microring weighting array chip is based on a silicon-based process or III-V materials-based processes.

Further, the microring weighting unit is composed of a straight-through waveguide, a coupling waveguide, a balanced photodetector and N microring resonators, the N microring resonators are series connection with the coupling waveguide through the straight-through waveguide, an input port of the straight-through waveguide is used as an input port of the microring weighting unit, an output port of the coupling waveguide and an output port of the straight-through waveguide are respectively connected with the balanced photodetector, an output port of the balanced photodetector is used as an output port of the microring weighting unit.

Further, the N microring resonators is used to control the coupling coefficient and transmission coefficient of N adjacent microring resonators according to the convolutional kernel coefficient control signal output by the convolutional kernel matrix control unit, and successively couple the N sub-modulated optical signals corresponding to N wavelengths in the M-channel multi-wavelength modulated optical signal with second-level delay into the coupling waveguide according to different coupling coefficients. At the same time, the N sub-modulated optical signals corresponding to N wavelengths are transmitted in the through waveguide with different transmission coefficients, and a coupling waveguide weighted modulated optical signal and a through waveguide weighted modulated optical signal are obtained.

Further, the balanced photodetector is used for photoelectric conversion of the coupling waveguide weighted modulated optical signal and the through waveguide weighted modulated optical signal to obtain M first-level weighted summation electrical signals.

Further, the multi-wavelength light source is a multi-wavelength laser, a mode-locked laser, a femtosecond laser, an optical frequency comb generator, an optical soliton optical frequency comb generator or a single-frequency signal externally modulated electro-optical modulator.

Further, the modulator is a Mach-Zehnder modulator or an electric absorption modulator.

The present invention also provides a two-dimensional photonic convolutional acceleration device for convolutional neural network, comprising a memory and one or more processors, the memory stores executable code, when the executable code is executed by the one or more processors, it is used to realize a two-dimensional photonic convolutional acceleration method for convolutional neural network described in any of the above items.

The beneficial effects of the present invention are:

1. The present invention realizes two-dimensional convolutional acceleration based on wavelength-time interleaving technology, a single modulator can realize the optical domain loading of the signal, and the convolutional operation speed is only limited to the speed of the modulator.

2. The present invention can realize two-dimensional convolutional kernel convolutional acceleration of two-dimensional data in a single signal cycle based on two-level delay and microring weighting array chip, and solve the problem of data redundancy in traditional methods, the scheme is simple, efficient and small.

3. The present invention realizes the control of convolutional kernel matrix coefficient based on the microring weighting array chip, can realize the fast update of convolutional kernel matrix coefficient, and is suitable for real-time data processing applications, the balanced photodetector can realize arbitrary convolutional kernel coefficient weighting.

DETAILED DESCRIPTION OF THE INVENTION

The following description of at least one exemplary embodiment is in fact only illustrative and in no way serves as any restriction on the present invention and its application or use. Based on the embodiments in the present invention, all other embodiments obtained by ordinary technicians in the art without creative work fall within the scope of protection of the invention.

Figure 1:
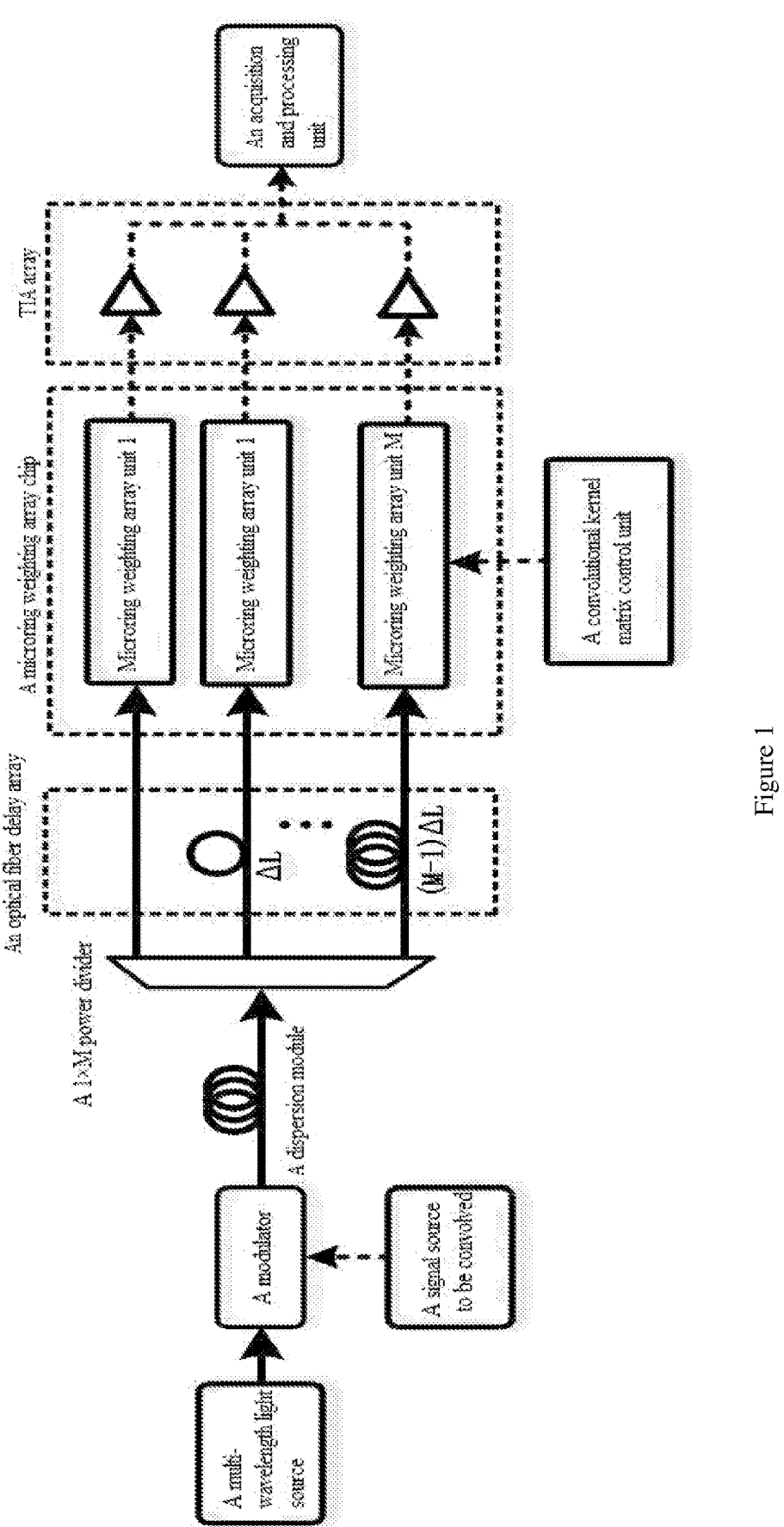
FIG. 1 is the structure diagram of a two-dimensional photonic convolutional acceleration system for convolutional neural network of the invention.

See FIG. 1, a two-dimensional photonic convolutional acceleration system for convolutional neural network, comprising:

a multi-wavelength light source, generating multi-wavelength optical signals containing N wavelengths and transmitting the multi-wavelength optical signals to a modulator;

The multi-wavelength light source is a multi-wavelength laser, a mode-locked laser, a femtosecond laser, an optical frequency comb generator, an optical soliton optical frequency comb generator or a single-frequency signal externally modulated electro-optical modulator.

a signal source to be convolved, converting an original two-dimensional data to be convolved into a one-dimensional signal to be convolved, and transmitting the signal to be convolved to the modulator;

the modulator, loading the signal to be convolved onto the multi-wavelength optical signal, obtaining a multi-wavelength modulated optical signal, and transmitting the multi-wavelength modulated optical signal to a dispersion module;

the modulator is a Mach-Zehnder modulator or an electric absorption modulator.

The dispersion module, realizing equal-interval dispersion delay for the N sub-modulated optical signals corresponding to N wavelengths in the multi-wavelength modulated optical signal, obtaining the multi-wavelength modulated optical signal after dispersion delay, and transmitting the multi-wavelength modulated optical signal after dispersion delay to a 1×M power divider;

The dispersion module is a dispersion fiber, a Bragg dispersion grating or a spatial dispersion module, a time of the equal-interval dispersion delay is: $\Delta t = 1/S_M$, wherein, $\Delta t$ is a duration of a single symbol of the signal to be convolved, and $S_M$ is a symbol rate of the signal to be convolved.

the 1×M power divider, dividing the multi-wavelength modulated optical signal after dispersion delay into M-channel multi-wavelength modulated optical signal, and transmitting the M-channel multi-wavelength modulated optical signal to an optical fiber delay array;

the optical fiber delay array, which is composed of M-segment optical fibers, increasing the equal-interval second-level delay of M-channel multi-wavelength modulated optical signal in order to obtain a M-channel multi-wavelength modulated optical signal with second-level delay, and transmitting the M-channel multi-wavelength modulated optical signal with second-level delay to a microring weighting array chip;

increasing the equal-interval second-level delay in turn for the M-channel multi-wavelength modulated optical signal specifically as follows: a length of the optical fiber increases in turn $\Delta L = (O-1)c\Delta t/n_f$, wherein, $\Delta t$ is a duration of a single symbol of the signal to be convolved, O is a number of original two-dimensional data columns to be convolved, c is a speed of light in vacuum, and $n_f$ is a refractive index of the optical fiber.

the microring weighting array chip, comprising M microring weighting units, which are respectively used to weight and sum the N sub-modulated optical signals contained in each of the M-channel multi-wavelength modulated optical signal with second-level delay, and obtaining M first-level weighted summation electrical signals, and transmit M first-level weighted summation electrical signals to a trans-impedance amplifier array;

the microring weighting array chip is based on a silicon-based process or III-V materials-based processes.

the microring weighting unit is composed of a straight-through waveguide, a coupling waveguide, a balanced photodetector and N microring resonators, the N microring resonators are series connection with the coupling waveguide through the straight-through waveguide, an input port of the straight-through waveguide is used as an input port of the microring weighting unit, an output port of the coupling waveguide and an output port of the straight-through waveguide are respectively connected with the balanced photodetector, an output port of the balanced photodetector is used as an output port of the microring weighting unit.

the N microring resonators is used to control the coupling coefficient and transmission coefficient of N adjacent microring resonators according to the convolutional kernel coefficient control signal output by the convolutional kernel matrix control unit, and successively couple the N sub-modulated optical signals corresponding to N wavelengths in the M-channel multi-wavelength modulated optical signal with second-level delay into the coupling waveguide according to different coupling coefficients. At the same time, the N sub-modulated optical signals corresponding to N wavelengths are transmitted in the through waveguide with different transmission coefficients, and a coupling waveguide weighted modulated optical signal and a through waveguide weighted modulated optical signal are obtained.

the balanced photodetector is used for photoelectric conversion of the coupling waveguide weighted modulated optical signal and the through waveguide weighted modulated optical signal to obtain M first-level weighted summation electrical signals.

a convolutional kernel matrix control unit, providing a convolutional kernel coefficient control signal to the microring weighting array chip;

the trans-impedance amplifier array, comprising M trans-impedance amplifiers, amplifying the M first-level weighted summation electrical signals respectively, and carrying out second-level summation of the amplified M first-level weighted summation electrical signals to obtain a second-level weighted summation electrical signals, and transmit the second-level weighted summation electrical signals to an acquisition and processing unit;

the acquisition and processing unit, collecting the second-level weighted summation electrical signals, and reconstructing it into a characteristic signal corresponding to the signal to be convolved.

First, the multi-wavelength optical signal containing N wavelengths output by the multi-wavelength light source is sent to the modulator, and the signal to be convolved output by the signal source to be convolved is loaded onto the multi-wavelength optical signal through the modulator to obtain the multi-wavelength modulated optical signal, wherein, the signal to be convolved is the one-dimensional signal to be convolved from the original two-dimensional data to be convolved after matrix flattening. Then, the multi-wavelength modulated optical signal is sent to the dispersion module to realize the equal-interval dispersion delay of the N sub-modulated optical signals corresponding to N wavelengths in the multi-wavelength modulated optical signal, after the dispersion delay, the multi-wavelength modulated optical signal is divided into M-channel multi-wavelength modulated optical signals through the 1×M optical power splitter, the M-channel multi-wavelength modulated optical signals enters the optical fiber delay array and increases the equal-interval dispersion delay in turn, the M-channel multi-wavelength modulated optical signals after delayed are sent to the M microring weighting units of the microring weighting array chip for weighting, and the convolutional kernel matrix weighting coefficient of the microring weighting array chip is controlled by the convolutional kernel matrix control unit to obtain the M first-level weighted summation electrical signal, M first-level weighted summation electrical signals are amplified and summed into a second-level weighted summation electrical signal by the trans-impedance amplifier array, the acquisition and processing unit collects and processes the second-level weighted summation electrical signal to obtain the corresponding characteristic signal.

Figure 2:
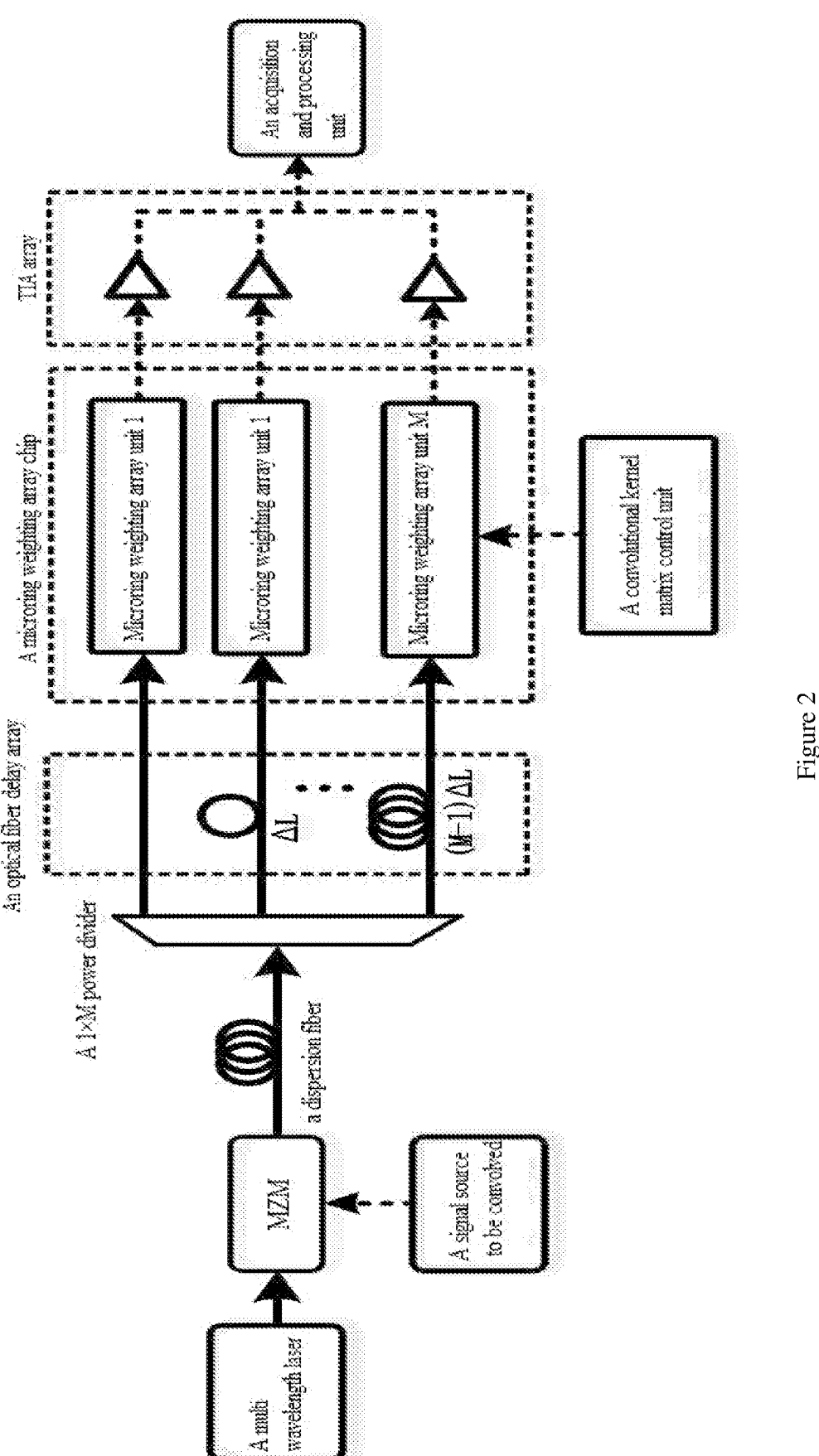
FIG. 2 is a structural diagram of the embodiment.

Embodiment: a two-dimensional photonic convolutional acceleration system for convolutional neural network is shown in FIG. 2, comprising: the multi-wavelength laser, the signal source to be convolved, the Mach-Zehnder modulator (MZM), the dispersion fiber, the 1×M optical power splitter, the fiber delay array, the microring weighting array chip, the convolutional kernel matrix control unit, the trans-impedance amplifier array (TIA array) and the acquisition and processing unit.

Figure 4:
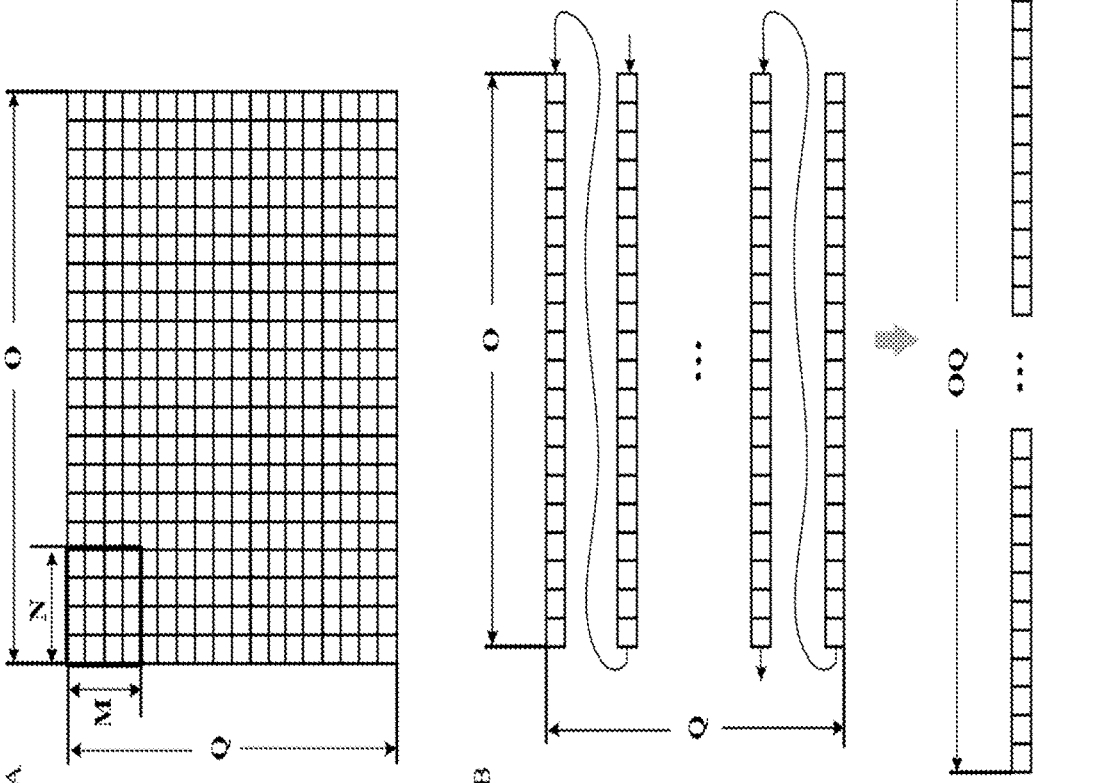
FIG. 4 is a schematic diagram of two-dimensional data and convolutional kernel matrix control unit processing in the embodiment.

First, the multi-wavelength laser outputs multi-wavelength optical signals with equal intensity at each wavelength, which can be expressed as $A=[A, A, A, \ldots, A]^T_{N \times 1}$, where N is a positive integer, corresponding to the number of columns of the two-dimensional convolutional kernel matrix control unit, and A is the single-wavelength optical signal strength. The multi-wavelength optical signal is sent to the Mach-Zehnder modulator (MZM), and the signal to be convolved output by the signal source to be convolved is modulated by the Mach-Zehnder modulator (MZM), and the signal to be convolved is respectively loaded on the different wavelengths of the multi-wavelength optical signal. The signal sequence to be convolved can be expressed as $x(i)=[x(1), x(2), x(3), \ldots, x(P)]$, where i is the discretization time sequence number, $P=OQ$ is the length of the signal to be convolved, and the signal to be convolved is the one-dimensional signal to be convolved after the original two-dimensional data to be convolved is processed by matrix flattening. The original signal to be convolved is shown in (A) in FIG. 4, which is a matrix of Q rows and O columns. The process of matrix flattening is to transform a two-dimensional or multidimensional matrix into a one-dimensional matrix, as shown in (B) in FIG. 4. Each intensity-modulated carrier corresponds to a signal to be convolved, and the multi-wavelength modulated optical signal is obtained, the multi-wavelength modulated optical signal $S_{Mod}$ can be expressed as matrix:

$$S_{Mod} = Ax(i) = \begin{bmatrix} Ax(i) \\ Ax(i) \\ \ldots \\ Ax(i) \end{bmatrix}_{N \times 1} = \begin{bmatrix} Ax(1) & Ax(2) & \ldots & Ax(P) \\ Ax(1) & Ax(2) & \ldots & Ax(P) \\ \ldots & & & \\ Ax(1) & Ax(2) & \ldots & Ax(P) \end{bmatrix}_{N \times P} \quad (1)$$

Figure 5:
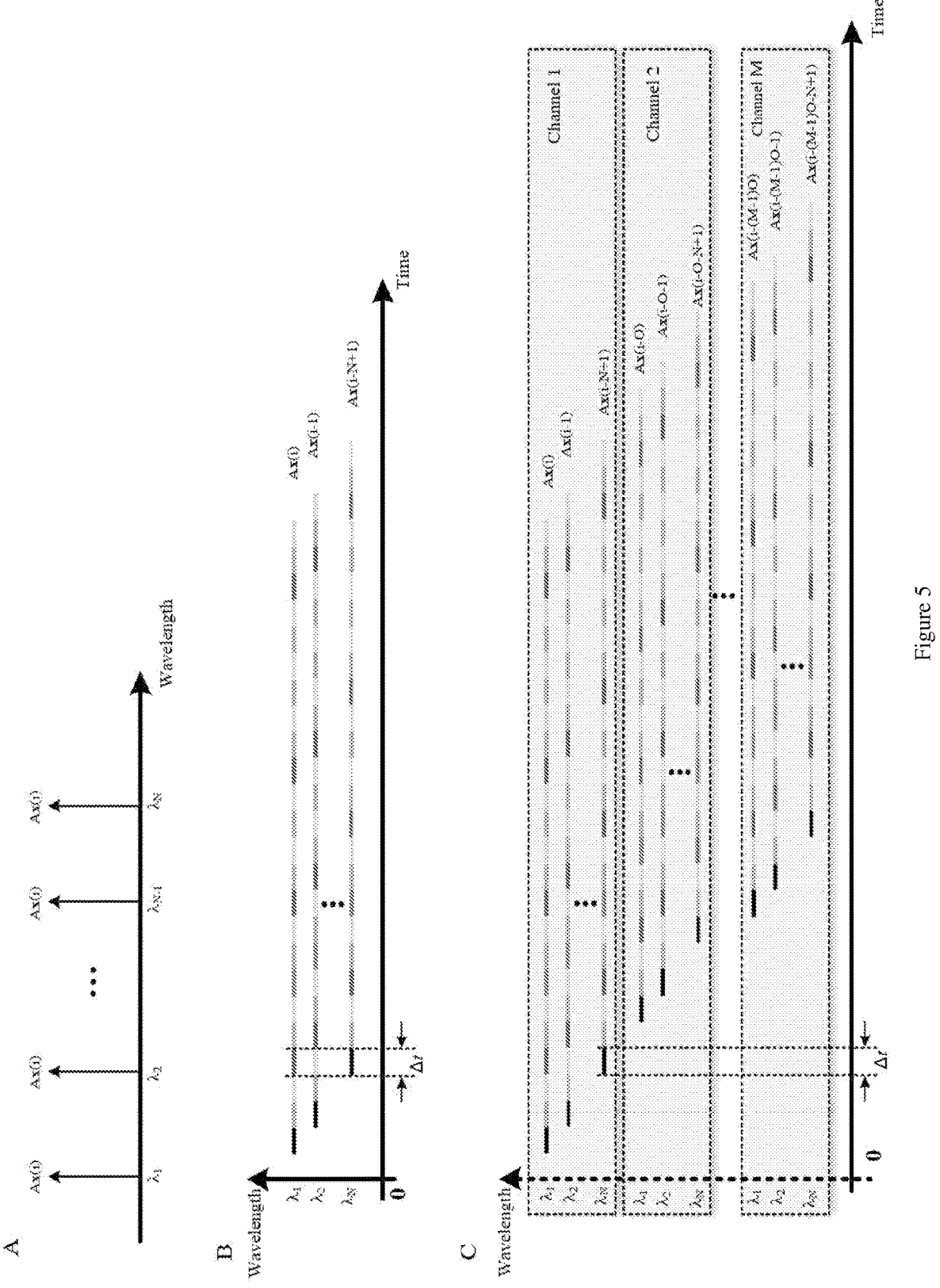
FIG. 5 is the spectral schematic diagram of each working node in the embodiment.

The corresponding spectral distribution is shown in (A) in FIG. 5. The multiple-wavelength modulated optical signal is sent into the dispersive optical fiber to realize the equal-interval dispersion delay of the N sub-modulated optical signals corresponding to N wavelengths in the multiple-wavelength modulated optical signal, the length of the dispersive optical fiber is $\Delta l = \Delta t/(D\Delta f)$, where D is the dispersion coefficient of the dispersion fiber, $\Delta t = 1/S_M$ is the duration of the single symbol of the signal to be convolved, that is, the time difference between $x(i)$ and $x(i-1)$, $S_M$ is the symbol rate of the signal to be convolved, the maximum symbol rate of the signal to be convolved depends on the modulator bandwidth, the multi-wavelength modulated optical signal $S_{Mod\_md}$ after dispersion delay can be expressed as:

$$S_{Mod\_md} = \begin{bmatrix} Ax(i) & 0 & 0 & \\ 0 & Ax(i-1) & 0 & \\ \ldots & & & \\ 0 & \ldots & 0 & Ax(i-N+1) \end{bmatrix}_{N \times (N-1)} \quad (2)$$

The relationship between time series and wavelength of multi-wavelength modulated optical signal after dispersion delay is shown in (B) in FIG. 5, the multi-wavelength modulated optical signal after dispersion delay is divided into M-channel multiple-wavelength modulated optical signal after being sent to the 1×M power splitter. The M-channel multiple-wavelength modulated optical signal is sent to the optical fiber delay array containing M delay fibers, the first optical fiber is taken as the reference in the optical fiber delay array, and the length of the other fibers increases $\Delta L = (O-1)c\Delta t/n_f$, where, O is a number of original two-dimensional data columns to be convolved, c is the speed of light in vacumm, $n_f$ is the refractive index of the optical fiber, and the multi-wavelength modulated optical signal after M-channel delay $S_{Mod\_mdd}$ can be expressed as:

$$S_{Mod\_md} = \quad (3)$$

$$\begin{bmatrix} Ax(i-(m-1)O) & 0 & 0 & \\ 0 & Ax(i-(m-1)O-1) & 0 & \\ \ldots & & & \\ 0 & \ldots & 0 & Ax(i-(m-1)O-N+1) \end{bmatrix}_{N \times (N-1)}$$

$$(m = 1,2, \ldots, M)$$

Figure 3:
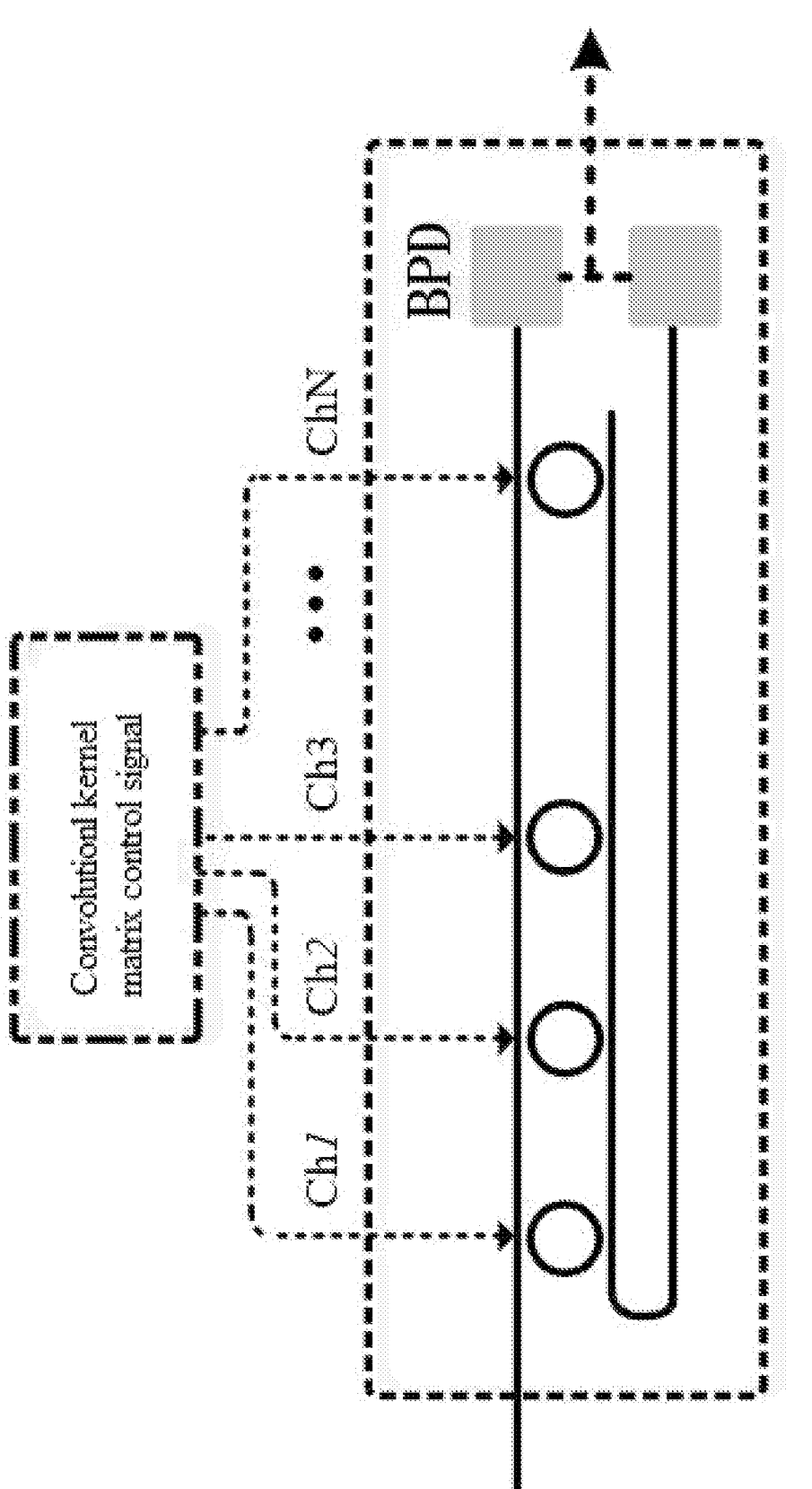
FIG. 3 is the structure diagram of the microring weighting unit of the embodiment.

The relationship between time series and wavelength of the delayed M-channel multi-wavelength modulated optical signal in a single coordinate system is shown in (C) in FIG. 5. Through the fiber-chip coupling technology, the delayed multi-wavelength modulated optical are respectively sent into the M microring weighting units in the microring weighting array chip. As shown in FIG. 3, the microring weighting unit is composed of N microring resonators, 1 straight-through waveguide, 1 coupling waveguide and 1 balanced photodetector (BPD). Among them, N microring resonators are connected in series with the coupling waveguide through the straight-through waveguide, the input port of the straight-through waveguide of the first microring resonator is the optical input port of the microring weighting unit, the output port of the coupling waveguide of the first micro-ring resonator and the output port of the straight-through waveguide are respectively connected with the balanced photodetector (BPD), and the electrical output port of the balanced photodetector (BPD) is the output port of the micro-ring weighting unit, the coupling coefficient and transmission coefficient of N adjacent microring resonators are controlled according to the control signal output from the convolutional kernel matrix control unit, and the N sub modulated optical signals corresponding to N wavelengths in the multi-wavelength modulated optical signals are sequentially coupled into the coupling waveguide according to different coupling coefficients, and the N sub modulated optical signals corresponding to N wavelengths are simultaneously transmitted in the through waveguide with different transmission coefficients, the coupling waveguide weighted modulated optical signal and the straight-through waveguide weighted modulated optical signal are obtained, and the convolutional kernel matrix coefficient $M_{con}$ is expressed as:

$$M_{con} = \begin{bmatrix} w_{11} & w_{12} & \dots & w_{1N} \\ w_{21} & w_{22} & \dots & w_{2N} \\ \dots & & & \\ w_{M1} & w_{M2} & \dots & w_{MN} \end{bmatrix}_{M \times N} = M_{con}^+ - M_{con}^- = \tag{4}$$

$$\begin{bmatrix} w_{11}^+ & w_{12}^+ & \dots & w_{1N}^+ \\ w_{21}^+ & w_{22}^+ & \dots & w_{2N}^+ \\ \dots & & & \\ w_{M1}^+ & w_{M2}^+ & \dots & w_{MN}^+ \end{bmatrix}_{M \times N} - \begin{bmatrix} w_{11}^- & w_{12}^- & \dots & w_{1N}^- \\ w_{21}^- & w_{22}^- & \dots & w_{2N}^- \\ \dots & & & \\ w_{M1}^- & w_{M2}^- & \dots & w_{MN}^- \end{bmatrix}_{M \times N}$$

$M_{con}^+$ and $M_{con}^-$ respectively represent the coupling coefficient and transmission coefficient corresponding to different microring resonators, then the microring weighted unit coupling waveguide weighted modulated optical signal $S_{Modcon\_m+}$ and straight-through waveguide weighted modulated optical signal of $S_{Modcon\_m-}$ can be expressed as:

$$S_{Modcon\_m+} = \begin{bmatrix} Ax\big(i-(m-1)O\big)w_{m1}^+ & 0 & 0 \\ 0 & Ax\big(i-(m-1)O-1\big)w_{m2}^+ & 0 \\ \dots & & \\ 0 & \dots & 0 & Ax\big(i-(m-1)O-N+1\big)w_{mN}^+ \end{bmatrix}_{N \times (N-1)} \tag{5}$$

$(m = 1,2, \dots, M)$ $$S_{Modcon\_m+} = \begin{bmatrix} Ax\big(i-(m-1)O\big)w_{m1}^- & 0 & 0 \\ 0 & Ax\big(i-(m-1)O-1\big)w_{m2}^- & 0 \\ \dots & & \\ 0 & \dots & 0 & Ax\big(i-(m-1)O-N+1\big)w_{mN}^- \end{bmatrix}_{N \times (N-1)} \tag{6}$$

$(m = 1,2, \dots, M)$

Figure 6:
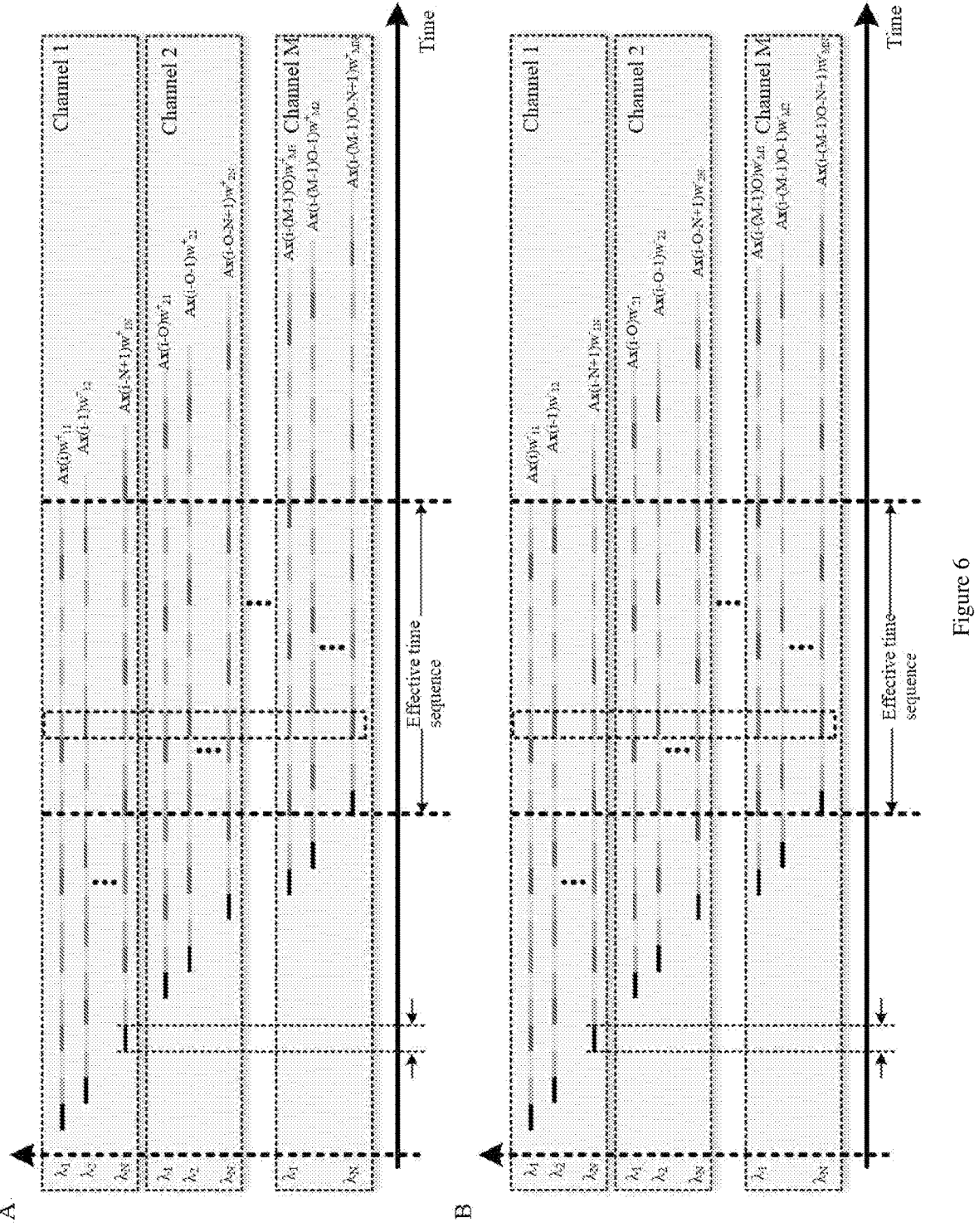
FIG. 6 shows the relationship between time series and wavelength of the coupling waveguide weighted modulated optical signal and the straight-through waveguide weighted modulated optical signal of the M micro-ring weighting units of the embodiment in the single coordinate system.

The relationship between time series and wavelength of weighted M coupling waveguide weighted modulated optical signals $S_{Modcon\_m+}$ and straight-through waveguide weighted modulated optical signals $S_{Modcon\_m-i}$ are shown in FIG. 6. The balanced photodetector (BPD) performs photoelectric conversion between the coupling waveguide weighted modulated optical signal and the straight-through waveguide weighted modulated optical signal to obtain the first-level weighted summation electrical signal. M first-level weighted summation electrical signals are sent to the trans-resistance amplifier array (TIA array), M trans-impedance amplifiers amplify M first-level weighted summation electrical signals respectively, and carry out second-level summation on the amplified M first-level weighted summation electrical signals to obtain the second-level weighted summation electrical signals. The signals within the effective time sequence of the second-level weighted summation electrical signals can be expressed as:

$$S_{ca}(r) \propto \sum_{m=1}^{m=M} \sum_{n=1}^{n=N} Ax\big(r+N-n+(m-1)O\big)w_{mn} \tag{7}$$

Figure 7:
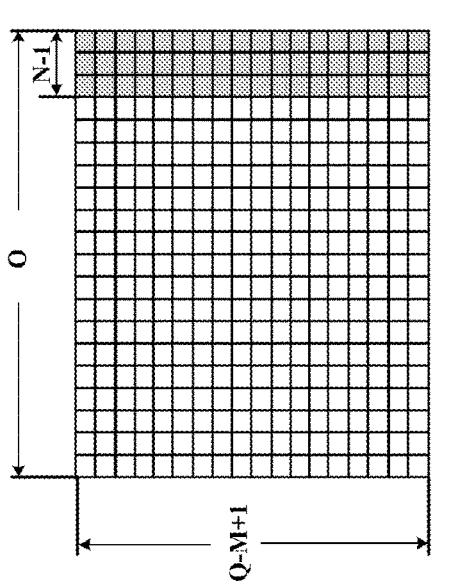
FIG. 7 is a two-dimensional characteristic signal of effective time sequence reconstruction in the embodiment.

Where, $S_{ca}(r)$ is the result of the rth convolutional operation, $w_{mn}$ is the convolutional kernel matrix coefficient. After the signal is collected by the acquisition and processing unit, the effective time sequence signal can be two-dimensional reconstructed in the digital domain in the opposite way of matrix flattening, the data of two-dimensional reconstruction is shown in FIG. 7, where, the gray N−1 column is redundant data. After the redundant data is removed, the two-dimensional characteristic signal after the convolutional operation of the signal to be convolved is obtained. The above process is an illustration of the specific embodiment when the original data is not filled with zero. When zero is added to the original data, the data with zero can be used as the original two-dimensional data.

Corresponding to the aforementioned embodiment of the two-dimensional photonic convolutional acceleration system for convolutional neural network, the present invention also provides an embodiment of two-dimensional photonic convolutional acceleration device for convolutional neural network.

Figure 8:
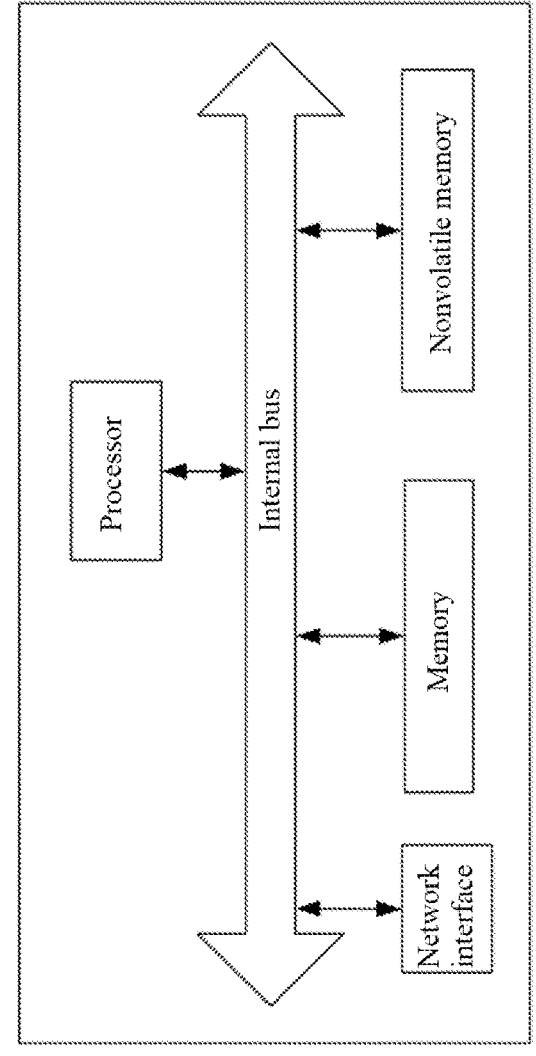
FIG. 8 is the structural diagram of a two-dimensional photonic convolutional acceleration device for convolutional neural network of the invention.

See FIG. 8, the embodiment of the present invention provides a two-dimensional photonic convolutional acceleration device for convolutional neural network, comprising a memory and one or more processors, the memory stores executable code, when the executable code is executed by the one or more processors, it is used to realize a two-dimensional photonic convolutional acceleration method for convolutional neural network described in the above embodiment.

The embodiment of the two-dimensional photonic convolutional acceleration device for convolutional neural network can be applied to any device with data processing capability, which can be a equipment or device such as a computer. The device embodiment can be realized by software, or by hardware or a combination of software and hardware. Taking software implementation as an example, as a device in the sense of logic, it is formed by reading the corresponding computer program instructions in the non-volatile memory into the memory by the processor of any device with data processing capability. From the hardware level, as shown in FIG. 8, it is a hardware structure diagram of any device with data processing capability where the two-dimensional photonic convolutional acceleration device for convolutional neural network of the present invention is located, in addition to the processor, memory, network interface, and non-volatile memory shown in FIG. 8, any device with data processing capability where the device is located in the embodiment can also include other hardware according to the actual function of the device with data processing capability, which will not be described again.

The implementation process of the functions and functions of each unit in the above device is detailed in the implementation process of the corresponding steps in the above method.

For the device embodiment, since it basically corresponds to the method embodiment, please refer to the partial description of the method embodiment for the relevant parts. The device embodiments described above are only schematic, wherein the units described as separate components can be or cannot be physically separated, and the components displayed as units can be or cannot be physical units, that is, they can be located in one place, or they can be distributed to multiple network units. Some or all of the modules can be selected according to the actual needs to achieve the purpose of the present invention. A person skilled in the art can understand and implement without creative work.

The above is only the preferred embodiment of the invention and is not intended to limit the invention. For those skilled in the art, the invention can have various changes and changes. Any modification, equivalent replacement, improvement, etc. made within the spirit and principle of the present invention shall be included in the protection scope of the invention.

The invention claimed is:

1. A two-dimensional photonic convolutional acceleration system for convolutional neural network, wherein, the system has a memory and a processor comprising:

a multi-wavelength light source, generating multi-wavelength optical signals containing N wavelengths and transmitting the multi-wavelength optical signals to a modulator;

a signal source to be convolved, converting an original two-dimensional data to be convolved into a one-dimensional signal to be convolved, and transmitting the signal to be convolved to the modulator;

the modulator, loading the signal to be convolved onto the multi-wavelength optical signal, obtaining a multi-wavelength modulated optical signal, and transmitting the multi-wavelength modulated optical signal to a dispersion module;

the dispersion module, realizing equal-interval dispersion delay for the N sub-modulated optical signals corresponding to N wavelengths in the multi-wavelength modulated optical signal, obtaining the multi-wavelength modulated optical signal after dispersion delay, and transmitting the multi-wavelength modulated optical signal after dispersion delay to a 1×M power divider;

the 1×M power divider, dividing the multi-wavelength modulated optical signal after dispersion delay into M-channel multi-wavelength modulated optical signal, and transmitting the M-channel multi-wavelength modulated optical signal to an optical fiber delay array;

the optical fiber delay array, which is composed of M-segment optical fibers, increasing the equal-interval second-level delay of M-channel multi-wavelength modulated optical signal in turn to obtain a M-channel multi-wavelength modulated optical signal with second-level delay, and transmitting the M-channel multi-wavelength modulated optical signal with second-level delay to a microring weighting array chip;

the microring weighting array chip, comprising M microring weighting units, which are respectively used to weight and sum the N sub-modulated optical signals contained in each of the M-channel multi-wavelength modulated optical signal with second-level delay, and obtaining M first-level weighted summation electrical signals, and transmit M first-level weighted summation electrical signals to a trans-impedance amplifier array;

a convolutional kernel matrix control unit, providing a convolutional kernel coefficient control signal to the microring weighting array chip;

the trans-impedance amplifier array, comprising M trans-impedance amplifiers, amplifying the M first-level weighted summation electrical signals respectively, and carrying out second-level summation of the amplified M first-level weighted summation electrical signals to obtain a second-level weighted summation electrical signals, and transmit the second-level weighted summation electrical signals to an acquisition and processing unit;

the acquisition and processing unit, collecting the second-level weighted summation electrical signals, and reconstructing it into a characteristic signal corresponding to the signal to be convolved.

2. The two-dimensional photonic convolutional acceleration system for convolutional neural network according to claim 1, wherein, the dispersion module is a dispersion fiber, a Bragg dispersion grating or a spatial dispersion module, a time of the equal-interval dispersion delay is: $\Delta t=1/S_M$, wherein, $\Delta t$ is a duration of a single symbol of the signal to be convolved, and $S_M$ is a symbol rate of the signal to be convolved.

3. The two-dimensional photonic convolutional acceleration system for convolutional neural network according to claim 1, wherein, the microring weighting array chip is based on a silicon-based process or III-V materials-based processes.

4. The two-dimensional photonic convolutional acceleration system for convolutional neural network according to claim 1, wherein, the microring weighting unit is composed of a straight-through waveguide, a coupling waveguide, a balanced photodetector and N microring resonators, the N microring resonators are series connection with the coupling waveguide through the straight-through waveguide, an input port of the straight-through waveguide is used as an input port of the microring weighting unit, an output port of the coupling waveguide and an output port of the straight-through waveguide are respectively connected with the balanced photodetector, an output port of the balanced photodetector is used as an output port of the microring weighting unit.

5. The two-dimensional photonic convolutional acceleration system for convolutional neural network according to claim 4, wherein, the N microring resonators is used to control the coupling coefficient and transmission coefficient of N adjacent microring resonators according to the convolutional kernel coefficient control signal output by the convolutional kernel matrix control unit, and successively couple the N sub-modulated optical signals corresponding to N wavelengths in the M-channel multi-wavelength modulated optical signal with second-level delay into the coupling waveguide according to different coupling coefficients, at the same time, the N sub-modulated optical signals corresponding to N wavelengths are transmitted in the through waveguide with different transmission coefficients, and a coupling waveguide weighted modulated optical signal and a through waveguide weighted modulated optical signal are obtained.

6. The two-dimensional photonic convolutional acceleration system for convolutional neural network according to claim 5, wherein, the balanced photodetector is used for photoelectric conversion of the coupling waveguide weighted modulated optical signal and the through waveguide weighted modulated optical signal to obtain M first-level weighted summation electrical signals.

7. The two-dimensional photonic convolutional acceleration system for convolutional neural network according to claim 1, wherein, the multi-wavelength light source is a multi-wavelength laser, a mode-locked laser, a femtosecond laser, an optical frequency comb generator, an optical soliton optical frequency comb generator or a single-frequency signal externally modulated electro-optical modulator.

8. The two-dimensional photonic convolutional acceleration system for convolutional neural network according to claim 1, wherein, the modulator is a Mach-Zehnder modulator or an electric absorption modulator.

9. A two-dimensional photonic convolutional acceleration device for convolutional neural network, wherein, comprising a memory and one or more processors, the memory stores executable code, when the executable code is executed by the one or more processors, it is used to realize a two-dimensional photonic convolutional acceleration system for convolutional neural network described in claim 1.

\* \* \* \* \*